United States Patent [19]

Gargiulo

[11] Patent Number: 5,346,658
[45] Date of Patent: Sep. 13, 1994

[54] METHOD FOR INSTALLING A PIPE LINER

[75] Inventor: Joseph L. Gargiulo, Colts Neck, N.J.

[73] Assignee: American Pipe & Plastics, Inc., Binghamton, N.Y.

[21] Appl. No.: 59,016

[22] Filed: May 5, 1993

Related U.S. Application Data

[63] Continuation of Ser. No. 818,616, Jan. 10, 1992, abandoned, which is a continuation-in-part of Ser. No. 709,635, Jun. 3, 1991, Pat. No. 5,213,727.

[51] Int. Cl.$^5$ .............................................. B29C 63/34
[52] U.S. Cl. ...................... 264/40.3; 156/287; 156/294; 264/40.6; 264/516; 264/269
[58] Field of Search ................... 138/97, 98; 264/40.3, 264/36, 516, 269, 40.6; 156/287, 294, 295, 95

[56]  References Cited

U.S. PATENT DOCUMENTS

| | | | |
|---|---|---|---|
| 2,695,255 | 11/1954 | Avery . | |
| 3,356,777 | 12/1967 | Barrett | 264/36 |
| 4,867,921 | 9/1989 | Steketee, Jr. | 264/269 |
| 4,950,446 | 8/1990 | Kinumoto et al. | 264/269 |
| 4,956,041 | 9/1990 | Miyazaki et al. | 264/516 |
| 5,034,180 | 7/1991 | Steketee, Jr. | 264/269 |

FOREIGN PATENT DOCUMENTS

| | | |
|---|---|---|
| 0291011 | 11/1988 | European Pat. Off. . |
| 0298125 | 1/1989 | European Pat. Off. . |
| 3732694 | 4/1989 | Fed. Rep. of Germany . |
| 3904524 | 8/1990 | Fed. Rep. of Germany . |
| 1394807 | 3/1965 | France . |
| 58-88281 | 5/1983 | Japan . |
| 714105 | 8/1954 | United Kingdom . |
| 1205170 | 9/1970 | United Kingdom . |
| 2018384 | 10/1979 | United Kingdom . |
| 2089461 | 6/1982 | United Kingdom ............... 138/97 |
| 2188695 | 10/1987 | United Kingdom . |
| 8704226 | 12/1986 | World Int. Prop. O. . |

Primary Examiner—Mathieu Vargot
Attorney, Agent, or Firm—Cumpston & Shaw

[57]  ABSTRACT

A method for installing a pipe liner in a pipe includes the steps of reducing the diameter of the liner, so that it can be positioned within the pipe, installing the liner in the pipe, enlarging an upstream end of the liner, disposing a liner expander within the upstream end of the liner, pressurizing the upstream end of the liner with a heated fluid, the temperature of the heated fluid being sufficient to soften the liner, and the pressure of the heated fluid being sufficient to propel the liner expander from the upstream end of the liner to a downstream end, allowing a portion of the heated fluid to bypass the liner expander for heating and softening the liner ahead of the expander, and reducing the temperature of the pressurizing fluid to cool the liner below the softening temperature, to allow it to stiffen and form a liner within the pipe.

9 Claims, 5 Drawing Sheets

METHOD FOR INSTALLING A PIPE LINER

This is a continuation of copending application(s) Ser. No. 07/818,616 filed on Jan. 10, 1992, now abandoned which is a continuation-in-part of application Ser. No. 07/709,635, filed Jun. 3, 1991, now U.S. Pat. No. 5,213,727, for Method and Apparatus for Installing a Pipe Liner.

BACKGROUND OF THE INVENTION

This invention relates generally to a method for lining horizontal pipe sections, and more particularly to such a method that is particularly suited to lining aging sections of sewer pipe extending between adjacent manholes, to reduce leakage due to cracking and the like, and to extend the useful life of such pipe sections.

Methods and apparatus for lining horizontal sections of sewer pipe are known, for example, from U.S. Pat. No. 4,985,196, and the references referred to therein. However, these known methods are not entirely satisfactory for a number of reasons, including, for example, the problem that we shall refer to as blistering. In accordance with the known processes, a pipe liner is drawn into a pipe section in a reduced cross section form, most commonly folded into a generally U-shape. This allows the entire lining section to be drawn easily through a sewer pipe section. The lining is then simultaneously softened and expanded by sealing one end, and introducing pressurized steam or another heated fluid into the other end. As the lining expands, it conforms to the inside surface of the sewer pipe section, and expands to a slightly larger diameter just beyond the ends of the section.

In accordance with the method and apparatus described in the aforementioned U.S. Pat. No. 4,985,196, the liner is formed from thermoplastic material having shape memory characteristics, such that the liner has an elastic memory actuable above a certain temperature. The liner is selected to have an outside diameter approximately equal to the inside diameter of the pipe to be lined. The liner is deformed into the generally U-shaped cross section at a temperature at least equal to the memory activation temperature, and cooled to fix the liner in the temporarily deformed, reduced cross section-shape. After the deformed liner has been inserted into the pipe, it is reheated to a temperature at least equal to the memory activation temperature, and the liner returns to its original cylindrical shape.

It is a principal object of the methods and apparatus of the prior art, as well as of this invention, to reline existing sewer pipe sections in situ. Existing sewer pipe sections may have residual effluents present that must be removed prior to installing a liner. While techniques are known for cleaning the sewer pipe sections before installing liners, these methods may not be entirely successful. Lateral service connections from the sewer pipe to adjacent residences or businesses are normally spaced along the length of the pipe. If effluents are inadvertently introduced through such laterals into the pipe during the lining installation process, a small amount of fluid may become trapped between the liner and the interior surface of the pipe. Such residual fluids cause the liner to bulge inwardly from the pipe wall, forming a blister.

The present invention has as an object to provide a method for installing a liner in an existing sewer pipe section that minimizes the formation of such blisters.

Further, the present invention aims to provide a method for installing a liner that is relatively easy to implement in the field, use durable components, and provides a consistently satisfactory installation in the face of varying existing conditions within the pipe prior to lining.

SUMMARY OF THE INVENTION

Briefly stated, and in accordance with the presently preferred embodiment of this invention, a method for installing a pipe liner in a pipe includes the steps of reducing the diameter of the liner, so that it can be positioned within the pipe, installing the liner in the pipe, enlarging an upstream end of the liner, disposing a liner expander within the upstream end of the liner, pressurizing the upstream end of the liner with a heated fluid, the temperature of the heated fluid being sufficient to soften the liner, and the pressure of the heated fluid being sufficient to propel the liner expander from the upstream end of the liner to a downstream end, providing means associated with the liner expander for allowing a portion of the heated fluid to bypass the liner expander for heating and softening the liner ahead of the expander, as-the expander is propelled by steam pressure from the upstream end of the liner to the downstream end of the liner, while maintaining a propelling pressure upstream of the expander, retaining the expander at least partially within the liner at the downstream end, for pressuring substantially the entire length of the liner, and reducing-the temperature of the pressurizing fluid to cool the liner below the softening temperature, to allow it to stiffen and form a liner within the pipe.

In accordance with a further aspect of this invention, the method of lining a pipe also comprises the steps of providing a restraining means attached to the expander, and led from the upstream end of the liner for controlling the rate at which the expander is propelled through the liner.

In accordance with another aspect of this invention, the heated fluid is steam.

In accordance with still another aspect of this invention, the method includes the additional step of disposing the liner expander within the liner, and sealing the upstream end of the liner with a plug.

In accordance with a still further aspect of the invention, the method comprises the additional step of maintaining the downstream end of the liner open during the propelling of the liner expander.

BRIEF DESCRIPTION OF THE DRAWINGS

The novel aspects of the invention are set forth with particularity in the appended claims. The invention itself, however, together with further objects and advantages thereof may be more fully appreciated by reference to the following detailed description of the invention, taken in connection with the accompanying drawings, in which:

DESCRIPTION OF THE PREFERRED EMBODIMENTS

Figure 1:
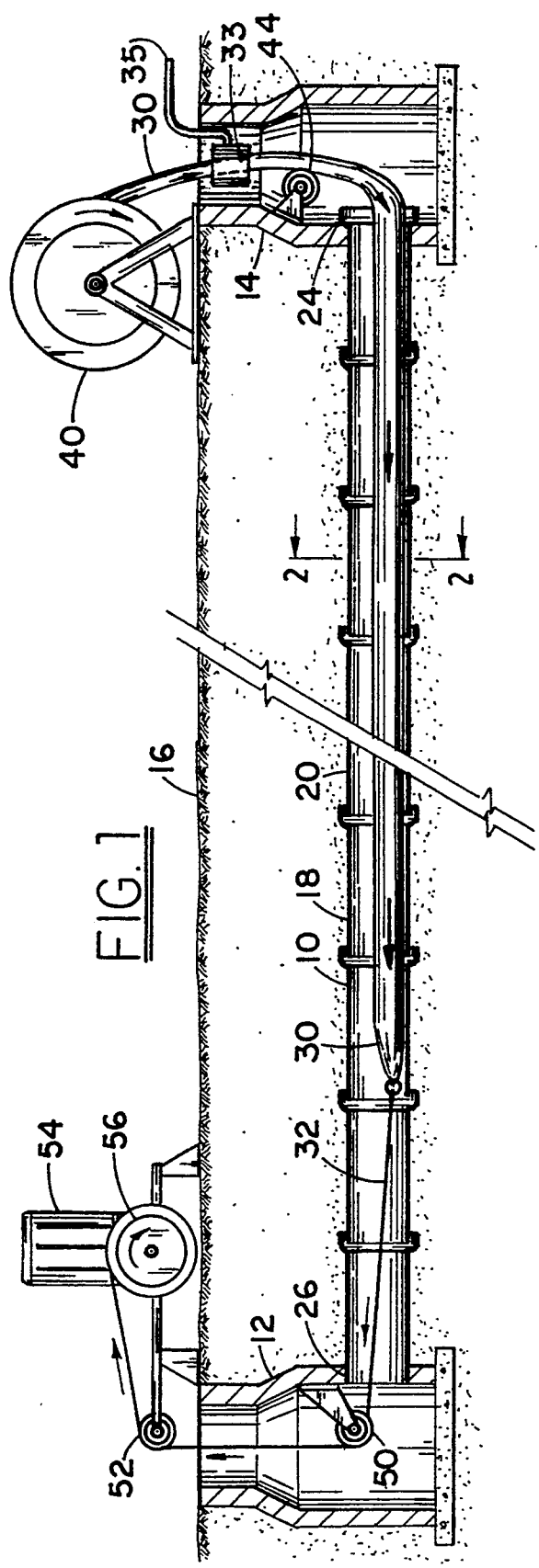
FIG. 1 is a diagrammatic view, partly in section, of an existing sewer pipe section extending between two manholes, showing a liner in accordance with this invention during process of installation.

Referring now to FIG. 1, a horizontal sewer pipe section 10 extends between two adjacent manholes, 12 and 14 buried beneath the surface 16 of the ground. It will be understood that further pipe sections, not shown, will extend from the illustrated manholes to further adjacent manholes, to form a sewer pipe network. Ordinarily, the sewer pipe section 10 between the adjacent manholes is formed from a plurality of sewer pipe segments 18, 20 that may be made from hardened or baked clay, or other similar materials. Over time, the pipe sections may crack and roots or the like may enter the pipe section, inhibiting the flow of effluents therethrough. Replacing the pipe sections by digging them up and substituting new sections is both time consuming and expensive, and may disrupt sewer service for an extensive period of time. Relining the pipe section is a greatly preferred method for restoring degraded pipe sections to service and extending their useful life.

Prior to beginning the installation of a pipe liner in accordance with this invention, the existing sewer pipe 10 is cleaned as thoroughly as possible by known methods, and inspected to determine and record the locations of all lateral service connections within the pipe. Various remotely controlled camera assemblies are available for inspection, both before and after cleaning. Cleaning itself may be accomplished through the use of remotely controlled augers and saws that are either pulled or moved under their own power along the length of the pipe.

Figure 9:
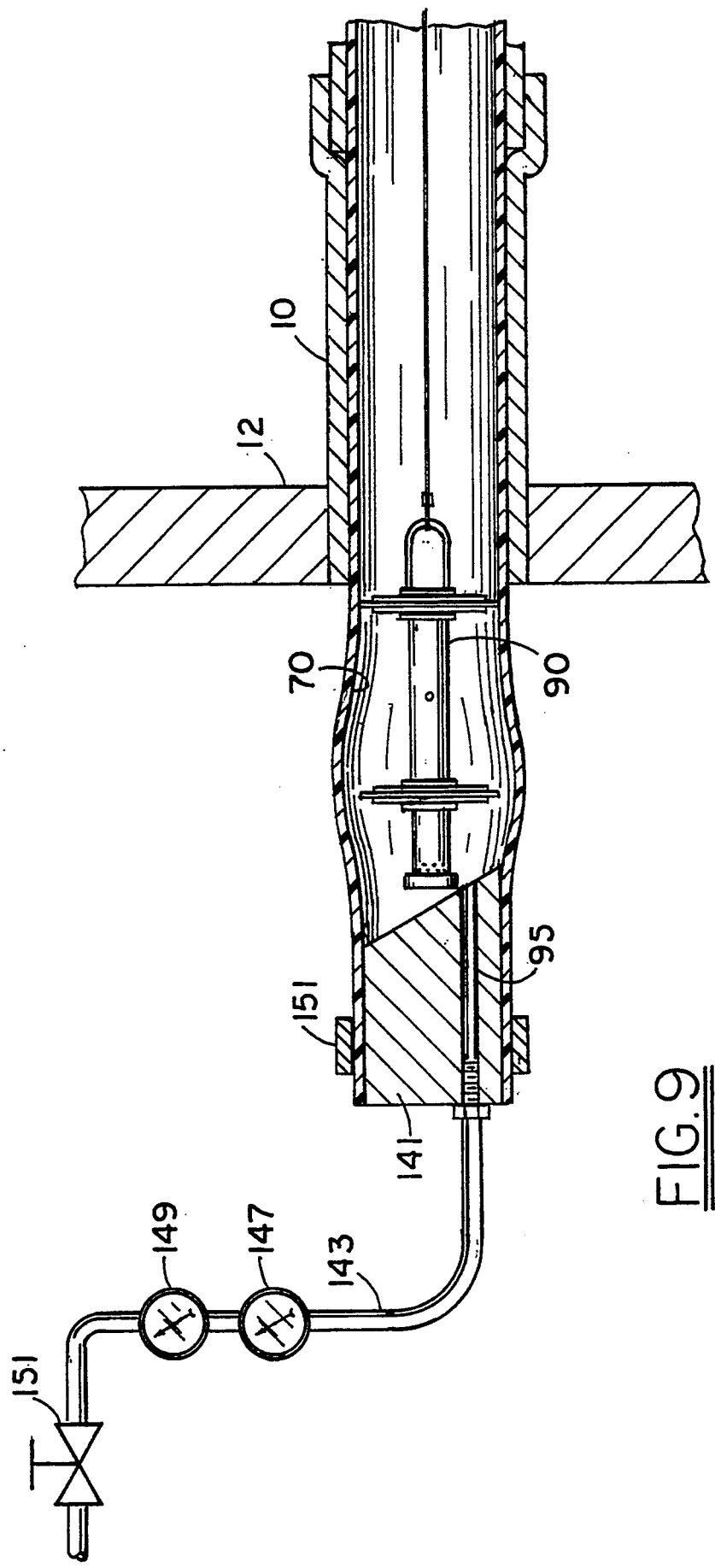
FIG. 9 is an enlarged sectional view of the downstream end of a sewer pipe showing a sealing plug in place in accordance with another aspect of this invention.

Although the horizontal sewer pipe section 10 is preferably inclined somewhat from an upstream end 24 to a downstream end 26 to promote drainage, and although cleaning prior to installation of the pipe removes substantially all residual materials from the inside of the pipe, there may be a small amount of residual liquid present, or additional liquids may be introduced from the lateral service feeders. In order to avoid overly complicating the drawing, no such lateral feeders are shown in FIG. 1, but an exemplary lateral is illustrated in FIG. 9.

Prior to installing the pipe liner 30, a pull wire 32 is snaked through the pipe section from the downstream end 26 to the upstream end 24. The pull wire 32 can be threaded through the pipe by any convenient manner, most preferably by attaching it to the cleaning or inspecting apparatus during one of those operations or by attaching it to a parachute device and vacuuming it through the pipe.

A supply or dispensing reel 40 of coiled prefolded liner 30 is provided at the upstream end. Preferably, an idler roller 44 is installed within the manhole 14, to guide the liner 30 into the upstream end 24 of the pipe 10. The liner itself is preferably a polymeric material, such as polyvinyl chloride.

Figure 2:
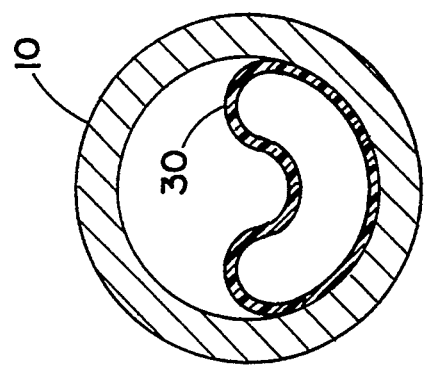
FIG. 2 is a cross section taken along lines 2—2 of FIG. 1, showing the shape of the folded liner and the pipe section.

The pipe liner 30 is preformed into a generally U-shaped configuration, as illustrated most clearly in FIG. 2, before or while being wound on the supply reel 40. The end of the coiled liner is preferably taper cut to avoid snagging during installation. The pull wire 32 is attached to the folded liner by a ring assembly 46 and shackle 48, for example, as shown in FIG. 3, prior to being drawn into the upstream end 24 of the pipe 10.

Alternatively, to reduce concentrated stress on the liner, the cable may be woven to the liner through preferably four drilled holes and secured.

The pull wire 32 is preferably trained around guiding pulleys 50, 52 within and adjacent the downstream manhole 12, and leading to a pulling engine 54 illustrated schematically, as located above the downstream manhole 12. The pull wire 32 is progressively wound around a pulling drum 56, as the liner is drawn through the pipe section 10.

Figure 3:
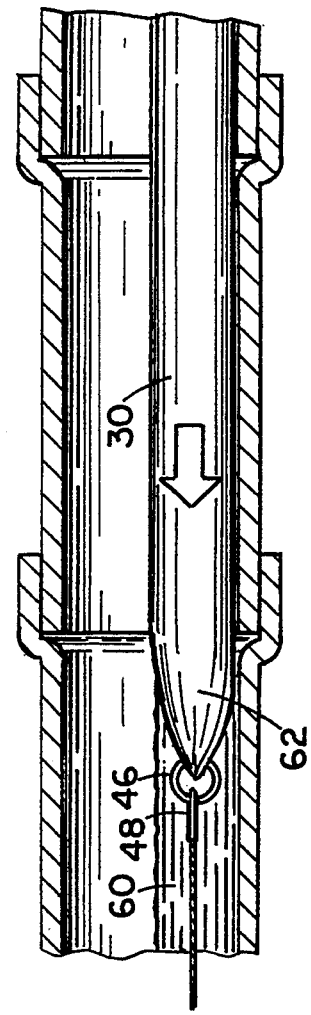
FIG. 3 is an enlarged sectional view of the liner being drawn into the pipe, as shown in FIG. 1.

As shown in FIG. 3, a substantial amount of effluent may accumulate in front of the leading end 62 of the liner 30, during installation as the liner is pulled through the pipe. Because of the inclination of the pipe section 10, most of this effluent will run out into the downstream manhole 12 and it will be appreciated that the amount of effluent 60 shown in FIG. 3 is exaggerated, to make its presence clear.

Preferably, when the coil of liner 30 is especially rigid because either of its formulation or because of cold ambient conditions, the pipe liner is preheated after withdrawing the liner from the dispensing reel and prior to entering manhole 14. The same source of steam, as is used subsequently during installation, or another source of steam, may be employed. In the alternative, the pipe may be simply sprayed with hot water.

Preferably, when an installation is performed at a site where the ambient temperature is low enough that the liner 30 cannot be led into the upstream end of the pipe within the manhole without presoftening the liner, a heating collar 33 is disposed around the liner within the manhole. The collar 30 is attached to a steam supply hose 35, and the liner 30 is warmed as it passes through the collar 33, before bending to enter the upstream end of the sewer pipe. Collar 33 may be a short section of pipe, sufficiently large to allow the folded liner to pass therethrough, and having a hose connection thereon for attaching to steam supply hose 35.

In accordance with a preferred embodiment of the collar 33, it is made from two pipe sections that are hinged together, so that the collar can be opened to allow it to be placed around liner 30 without the necessity for disconnecting cable 32.

The coil of liner may be steam heated through a water hose type coil to allow the liner to be unreeled while being steamed, to keep it soft.

Figure 4:
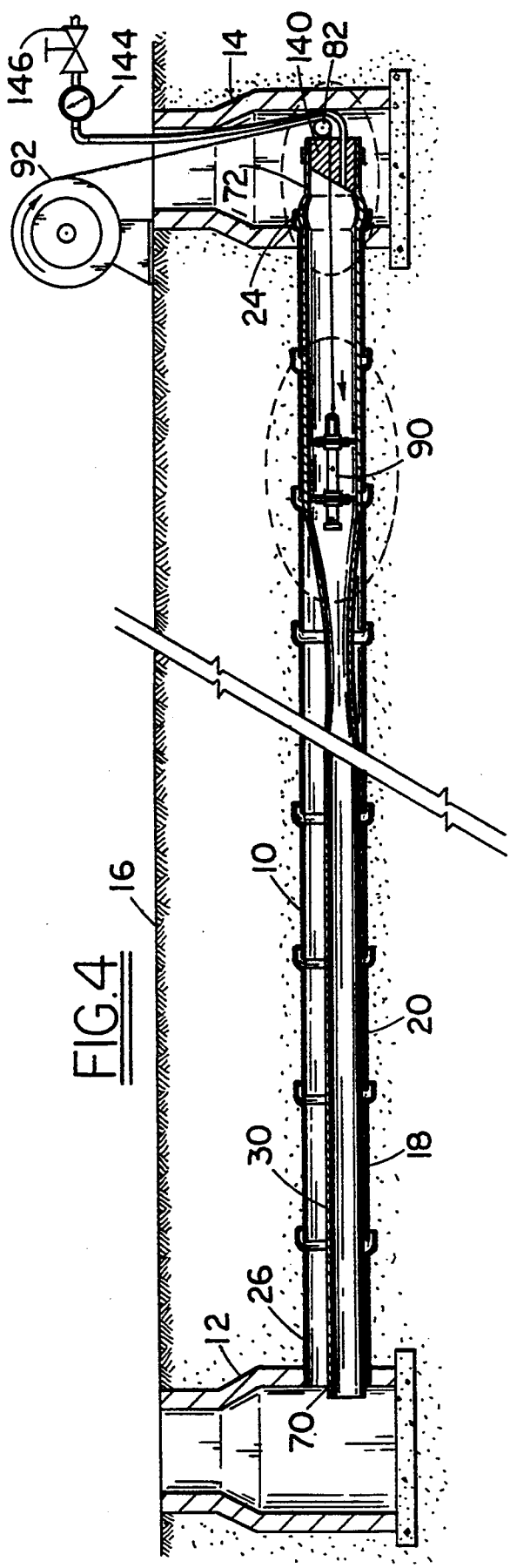
FIG. 4 is a side view, partly in section, showing how the liner is expanded in situ within the horizontal pipe section.

After the liner 30 has been pulled completely through the horizontal pipe section 10, the ends 70, 72 are trimmed to leave a short section extending beyond the upstream and downstream ends of the sewer pipe, as shown in FIG. 4.

Figure 7:
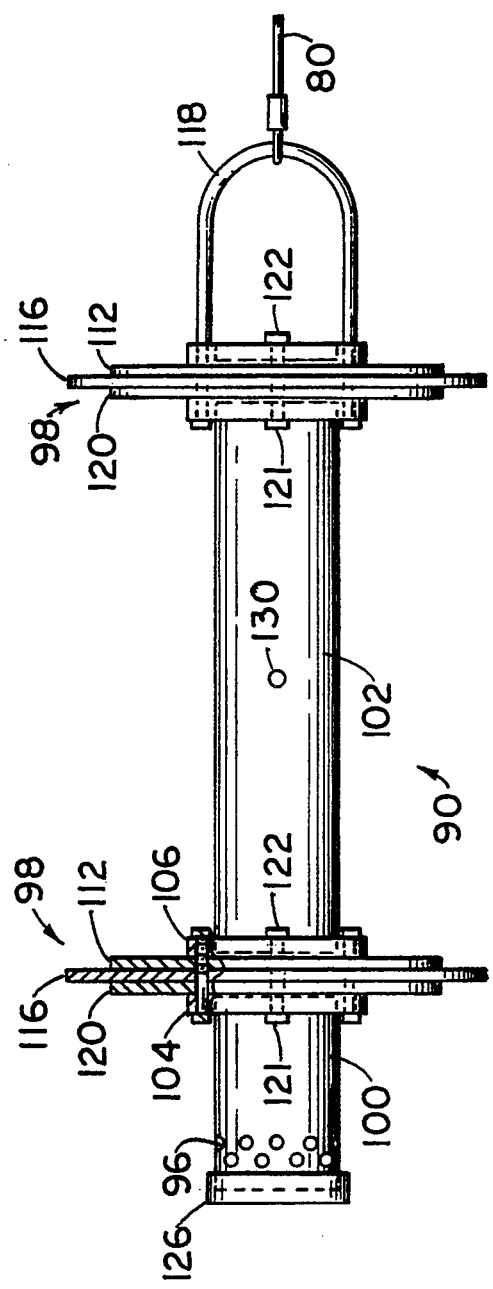
FIG. 7 is a side elevation of the pipe liner expander of FIG. 6.
Figure 6:
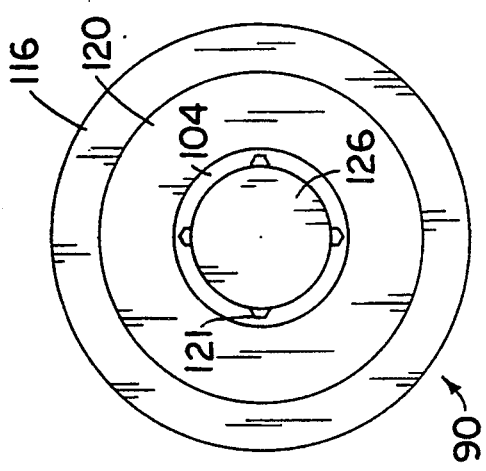
FIG. 6 is a front elevation of a pipe liner expander in accordance with this invention.
Figure 8:
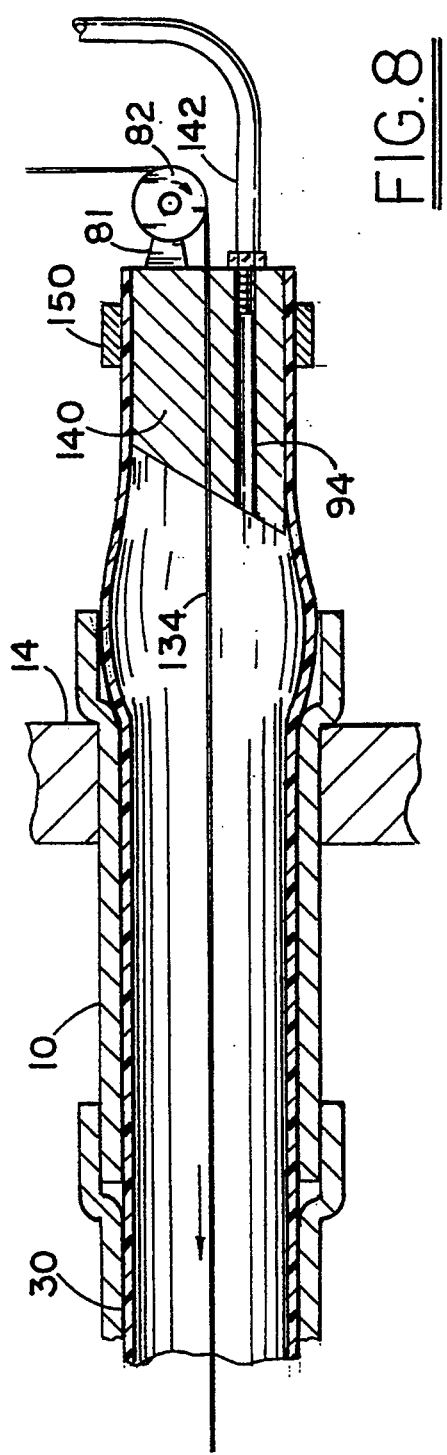
FIG. 8 is an enlarged sectional view of the upstream end of a sewer pipe showing a sealing plug in place.
Figure 10:
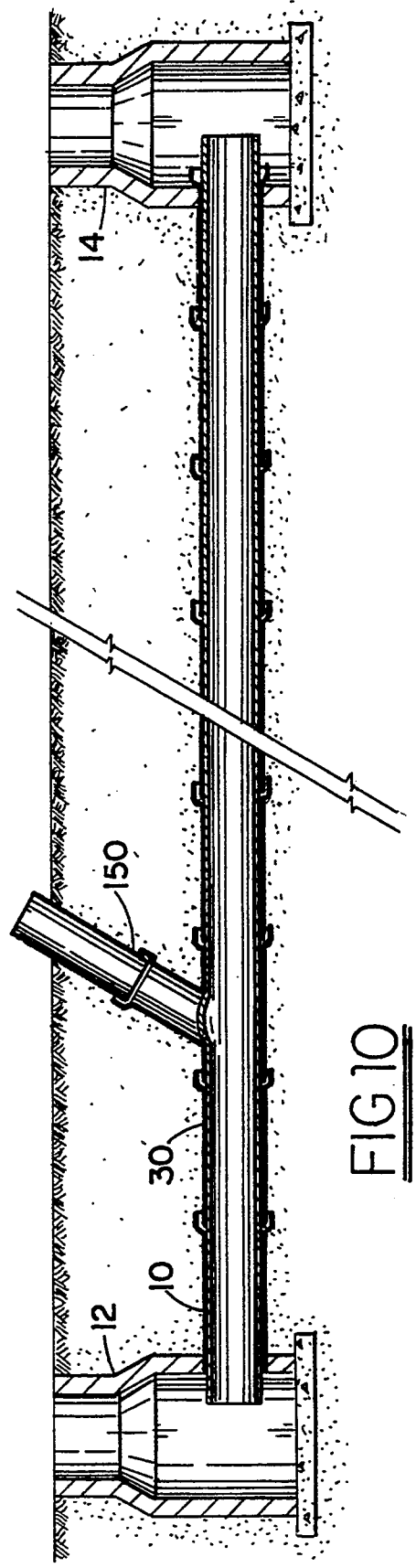
FIG. 10 is a cross section of a completed installation in accordance with the invention.

The upstream end 72 of the liner 30 is heated to soften it and the end 72 is expanded manually to a diameter sufficient to receive a liner expander assembly 90 within the liner 30 adjacent the upstream end 72 of the pipe. The liner expander assembly 90 is connected to a retaining cable 80 that is led through a plug 140 mounted in the portion 72 of the liner 30 extending beyond the end of the pipe 30, and secured by a clamp 150 or the like. Preferably, the cable 80 is trained around a pulley 82 or the like, and led to drum 92 from which it is uncoiled as the expander is propelled in a downstream direction. The plug 140 (shown in more detail in FIG. 8), includes a mounting stanchion 81 for mounting the pulley 82 and a through hole 94 provided with a threaded adapter for receiving a pipe 142 connected to a steam source, indicated schematically in FIG. 4 by a gauge 144 and a control valve 146. After the expander 90 has been inserted into the end 72 of the liner 30 and the plug 140 installed and clamped to seal the upstream end of the liner, steam heated externally of the liner is applied through the pipe 142 to pressurize the liner upstream of the expander. Preferably, steam is introduced through the plug 140 to the upstream side of the expander 90 in quantities sufficient to maintain between about five and about 10 psi steam pressure, as indicated by the gauge 144. The expander 90 itself is shown in more detail in FIGS. 6 and 7. The expander indicated generally at 90, includes a cylindrical body that is preferably formed from first and second 1¼" threaded nipples 100 and 102. First and second 1¼" threaded flanges 104, 106 are mounted on one end of the second nipple 102. A sandwich-like disk-shaped expander assembly is formed from first and second steel washers 112 and 120 and a ¼" thick disk 116 formed of high temperature rubber disposed between the washers 112, 120 to form a stiffened assembly 98 for engaging the inside of the pipe liner, to form a steam seal. A U-shaped bolt 118 extends through the threaded flanges, washers 112, 129 and the elastomeric disk 116 to form a point of attachment for the restraining cable. One or more fasteners, such as nut 121 and bolt 122 combinations, secure the two flanges to each other to compress the elastomeric member 116 between the two washers 112, 120.

A substantially identical second assembly is formed at the junction between the threaded nipples 100 and 102. In effect, the elastomeric member is stiflened by the metal washers 112, 120.

The end of the nipple 100 is sealed with a 1¼" threaded cap 126. A plurality of radially spaced apart steam holes 96 is formed adjacent the cap 126, and a single steam hole 130 is formed in the nipple 102 between the two disk assemblies 98.

Figure 5:
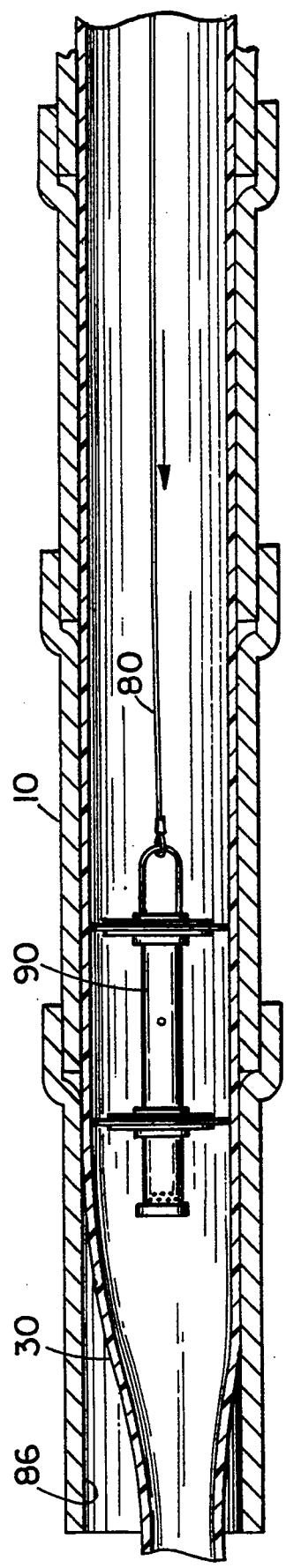
FIG. 5 is an enlarged segmental view of FIG. 4.

The number and size of holes 96 in the nipple 100 are selected to permit a steam pressure of about 5–15 psi, preferably 7–12 psi, to be maintained upstream of the expander 90, as the expander is propelled from the upstream end 24 of the pipe 10 towards the downstream end 26 of the pipe, as Shown in FIGS. 4 and 5. A single or double row of 5 to 20 holes may be used. The downstream end 70 of the liner 30 may be open to the atmosphere during expansion of the liner, as shown in FIG. 4, or closed with a plug as shown and described in connection with FIG. 9. As the expander 90 is propelled through the liner, steam enters the open upstream end of nipple 102 and is projected radially outwardly from the holes in the downstream end of nipple 100, and heats and softens the liner 30 ahead of the expander 90 by passing through the expander. The retaining cable 80 is played out from the drum 92 at a controlled and preferably reasonably constant rate, to permit the expander 90 to move smoothly through the liner 30, soften and expand the liner against the inside of the sewer pipe 10, and maintain steam pressure behind the expander to maintain the softened pipe in a fully expanded skate.

In accordance with the embodiment of the invention in which the downstream end of the liner is left open, the expander is used to seal the liner for cooling.

When the downstream one of the two disks 98 of the expander assembly 90 emerges from the downstream end 70 of the liner 30, the restraining cable 80 is tensioned to hold the expander 90 in this position, with one expander disk 98 inside the liner 30, and one expander disk 98 outside the liner 30. The pressurized steam feed is cooled to provide a pressurized air stream at a temperature below the softening point of the liner 30. Any hot steam in the liner is evacuated through the openings 96 in the expander assembly 90, while a relatively constant pressure of between 5 and 15 psi, preferably between 7-12 psi, of cooling air is maintained within the liner 30. Once the hot steam has been completely evacuated and replaced with cooling fluid, and the liner 30 has hardened, the restraining cable 80 is released and the pipe liner expander assembly 90 is propelled out the downstream end 70 of the liner 30.

An alternative method for cooling the liner after it has been expanded involves the arrangement shown in FIG. 9. The downstream portion 70 of the liner 30 that extends beyond the downstream end of the sewer pipe is cut to a length that exceeds the length of the expander assembly 90, by at least a small amount. A plug 141 which may be similar to the plug 140 inserted into the upstream end of the liner is inserted into the downstream end, and clamped with a clamp 151 or the like. A through hole 95 extends through the plug 141, and a coupling is provided for attaching an exhaust hose 143. Two gauges are provided in the hose 143, a temperature gauge 147, and a pressure gauge 149. An adjustable valve 151 is connected to the hose after the temperature and pressure gauges, as shown in FIG. 9. Use of the apparatus shown in FIG. 9 makes carrying out the steps just described above much simpler Once the expander assembly has passed beyond the end of the sewer pipe, the steam source at the upstream end is replaced by a source of pressurized cooling air. A sufficient quantity of air is supplied to the upstream end, to maintain pressure within the pipe of at least about 12 psi. The pressure is most conveniently regulated from the downstream end by monitoring the pressure gauge 149, while adjusting the control valve 151, to maintain the controlled pressure. Sufficient cooling air pressure must be maintained within the pipe, with due consideration being given to the thickness of the liner, and the length of the pipe, to ensure that the liner maintains its expanded configuration 5–15 psi, preferably 7–12 psi, is appropriate for semi-flexible PVC liners. The pressurized cooling air is maintained in the pipe until the temperature of air passing from the downstream end of the pipe, as indicated by the temperature gauge, is well below the softening point of the liner. The temperature will depend on the liner material, but may be about 80° F. for semi flexible PVC liners. Preferably cooling air is allowed to flow for about 15 minutes, to permit the liner to harden completely. At this point, the downstream plug can be removed, the liner trimmed to length, and the job is completed.

It will be appreciated that the liner 30 is initially conformed to the inside surface 86 of the pipe 10 through the action of the expanders 98, not by being pressurized. This ensures that the liner 30 is progressively conformed to the inside surface of the pipe 10, as the expander assembly 90 is propelled from the upstream end 72 to the downstream end 70. Any tendency of prior art methods to trap effluent between the liner and the pipe, as large sections of the liner are pressurized to conform it to the inside surface of the pipe, are eliminated.

As the expander assembly 90 is propelled through the liner 30 by steam pressure, steam from the openings 96 is projected radially, and heats and softens the liner 30 in front of the first of the disk shaped expanders 98. The expanders 98 conform the liner 30 to the inside surface 86 of the pipe 10, in a progressive manner, as the assembly 90 is propelled from the upstream end 24 to the downstream end 26 of the pipe 10. The two expanders 98 conform the liner 30 to the inside surface 86 of the pipe 10, and create a squeegee type action between the outside wall of the liner 30 and the inside surface 86 of the pipe 10 that progressively pushes any residual effluent 60 in front of the advancing assembly 90 and out the downstream end 26 of the sewer pipe 10.

After the expander assembly 90 has been propelled through the entire length of the liner 30, and the liner cooled and allowed to harden, the expander assembly 90 is removed, to produce a lined pipe section as shown in FIG. 9, the lining 30 is then opened at the previously located lateral services 150 in known fashion, and the ends of the liner 30 are trimmed. The sewer line is then put back into service.

While a preferred embodiment of the invention has been shown and described with particularity, it will be appreciated that various changes and modifications may suggest themselves to one having ordinary skill in the art upon being apprised of the present invention. It is intended to encompass all such changes and modifications as all within the scope and spirit of the appended claims.

What is claimed is:

1. A method for installing a pipe liner in a pipe comprising the steps of:
   reducing the diameter of the liner so that it can be positioned within the pipe;
   installing the liner in the pipe;
   enlarging an upstream nd of the liner;
   disposing a liner expander having at least one resilient disk shaped expanding portion within the upstream end;
   inserting a plug in the upstream end of the liner while leaving the downstream end of the liner open to atmospheric pressure;
   connecting a source of heated fluid, the fluid heated external to the liner, to the plug, the heated fluid having a temperature sufficient to soften the liner for mechanical expansion by the liner expander;
   injecting the heated fluid through the plug and into the liner, upstream of the liner expander, and allowing a portion of the heated fluid to pass through the liner expander for heating and softening the liner immediately ahead and in front of the liner expander;
   pressurizing the upstream end of the liner with the heated fluid at a pressure being sufficient to propel the liner expander from the upstream end to a downstream end of the liner for continuously, progressively engaging the liner with the expanding portion of the liner expander to mechanically expand the liner into contact with the pipe;
   retaining the liner expander at least partially within the liner at the downstream end to seal the downstream end of the liner and
   reducing the temperature of the externally heated fluid to below the softening temperature of the liner.

2. The method o claim 1 further comprising the step of providing restraining means attached to the liner expander, the restraining means being led from the upstream end of the liner for controlling the rate at which the liner expander is propelled through the pipe.

3. The method of claim 1 in which the heated fluid is steam.

4. The method of claim 1 in which installing a liner in the pipe comprises the steps of providing a supply of liner on a dispensing reel and
   heating the liner to a softening point after withdrawing the liner from the dispensing reel, but before inserting it into the pipe.

5. A method for installing a pipe liner in a pipe comprising the steps of:
   reducing the diameter of the liner so that it can be positioned within the pipe;
   installing the liner in the pipe;
   enlarging an upstream end of the liner;
   disposing a liner expander having at least one disk shaped expanding portion within the upstream end;
   inserting a plug in the upstream end of the liner;
   connecting a source of heated fluid, the fluid heated external to the liner, to the plug, the heated fluid having a temperature sufficient to soften the liner for mechanical expansion by the liner expander;
   injecting the heated fluid through the plug and into the liner, upstream of the liner expander, and allowing a portion of the heated fluid to pass through the liner expander for heating and softening the liner immediately ahead and in front of the liner expander;
   pressurizing the upstream end of the liner with the heated fluid at a pressure being sufficient to propel the liner expander from the upstream end to a downstream end of the liner for continuously, progressively engaging the liner with the expanding portion of the liner expander to mechanically expand the liner into contact with the pipe;
   attaching an exhaust means to the downstream end of the liner; and
   cooling the externally supplied source of heated fluid while monitoring the pressure and temperature of the fluid in the exhaust for maintaining the pressure within the liner at a temperature sufficient to maintain the liner in its expanded condition, until the temperature has dropped below the softening temperature of the liner.

6. The method of claim 5 further comprising the step of providing restraining means attached to the liner expander, the restraining means being led from the upstream end of the liner for controlling the rate at which the liner expander is propelled through the pipe.

7. The method of claim 5 in which the heated fluid is steam.

8. The method of claim 5 comprising maintaining the downstream end of the liner open during the propelling of the liner expander.

9. The method of claim 5 in which installing a liner in the pipe comprises the steps of providing a supply of liner on a dispensing reel and
   heating the liner to a softening point after withdrawing the liner from the dispensing reel, but before inserting it into the pipe.

* * * * *